United States Patent Office 3,316,266
Patented Apr. 25, 1967

3,316,266
3-AMINOPYRAZINOIC ACID DERIVATIVES AND PROCESS FOR THEIR PREPARATION
Roger J. Tull, Metuchen, and Jan ten Broeke, Watchung, N.J., and Edward J. Cragoe, Jr., Lansdale, Pa., assignors to Merck & Co., Inc., Rahway, N.J., a corporation of New Jersey
No Drawing. Filed Mar. 31, 1964, Ser. No. 356,039
10 Claims. (Cl. 260—250)

This invention relates to a method for the synthesis of 3-aminopyrazinoic acid and its derivatives which are substituted by chlorine at the 5-, 6,6-, or 6-positions of the pyrazine ring.

It has been discovered that a 3-amino-5,6-dichloropyrazinoic acid derivative (Compound II) can be prepared by the reaction of a 3-aminopyrazinoic acid derivative (Compound I) with sulfuryl chloride:

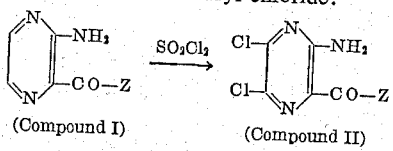

(Compound I)    (Compound II)

In the preferred embodiment of this invention Compound I is a pyrazinoic acid ester, where Z is represented by a lower alkoxy radical. Z is Compound I can also be

where R and R¹ each represent hydrogen or a lower alkyl radical. Should a halogen be introduced simultaneuosly on an amino-group, this can be removed readily by the interaction of the product with a bisulfite such as an alkali metal bisulfite.

The introduction of a chlorine in the 5-position of the pyrazine ring takes place when a substituent is present in the 6-position; likewise the introduction of chlorine in the 6-position takes place when a substituent is present in the 5-position. For example, a halogen atom can be attached to the 6-position, or a hydrocarbon radical such as alkyl, cycloalkyl or mononuclear aryl may be present at either the 5- or the 6-position in the pyrazine ring, and chlorination will take place in the position which is unsubstituted. When a halogen other than chlorine (particularly bromine and iodine) is attached to the 6-position it will be replaced by chlorine by the novel method of this invention.

The products represented by Compound II are useful intermediates in the preparation of pyrazinoylguanidines, pyrazinamidoguanidines, and pyrazinoylbenzamidines which possess diuretic and natriuretic properties useful in the treatment of edema, hypertension and other diseases known to be responsive to this therapy.

A typical example of such a useful diuretic compound is (3 - amino-5-dimethylamino-6-chloropyrazinoyl)guanidine, the preparation of which is described in Example 12 by the reaction of dimethylamine and (3-amino-5,6-dichloropyrazinoyl)guanidine. The latter compound can be prepared by introducing chlorine into the pyrazine nucleus at the 5,6-positions, for example, using methyl 3-aminopyrazinoate as the starting material (Example 1).

The reaction of sulfuryl chloride with the pyrazinoic acid compound proceeds most favorably at atmospheric pressure and at a temperature with a range of from about 25° C. to 70° C. In many instances, the reaction is exothermic and will require cooling means to maintain the desired temperature. Conveniently, the reaction takes place at the reflux temperature of the reaction mixture. The reaction proceeds quite rapidly and is usually complete in about one-half to three hours, although in some instances substantially longer reaction times are required.

A solvent reaction medium is not required, but inert solvents such as benzene, toluene, hexane, octane, chlorobenzene, carbon tetrachloride or the like can be utilized.

The sulfuryl chloride is ordinarily employed in excess of the amount theoretically required. About five parts of sulfuryl chloride to one part of the pyrazinoic acid derivative has been found particularly effective. An excess of sulfuryl chloride may act as solvent for the reaction.

The desired product can be recovered by heating the reaction mixture on a steam bath under vacuum to remove the excess sulfuryl chloride. The crude product then can be washed, dried and recrystallized from a solvent such as acetonitrile, ethyl acetate or the like.

A 3-aminopyrazinoic acid ester which is substituted by chlorine at the 5-, 5,6- or 6-positions of the pyrazine nucleus can be hydrolyzed into the corresponding acid by careful hydrolysis. Example 12 represents typical operating conditions for carrying out this hydrolysis with alkali.

The methyl 3-aminopyrazinoates having a hydrocarbon group in the 6-position can be prepared from the corresponding 6-substituted 3-aminopyrazinamide by heating on a steam bath with a 10% sodium hydroxide solution to form the corresponding sodium salt of the 6-substituted-3-amino-pyrazinoic acid. The salt then is dissolved in hot water and acidified with hydrochloric acid to form the corresponding pyrazinoic acid. This latter compound can be converted to the corresponding methyl ester by reaction with methanol in the presence of hydrogen chloride. Alternatively, the methyl ester can be prepared by the reaction of the sodium salt of the pyrazinoic acid with methyl sulfate in methanol.

The amides of Compound I can be made by treatment of the methyl 3-aminopyrazinoate compound with ammonia, or with the appropriate primary or secondary amine.

The following examples illustrate methods of carrying out the present invention but it is to be understood that these examples are given for purposes of illustration and not of limitation.

EXAMPLE 1

Methyl 3-amino-5,6-dichloropyrazinoate

Methyl 3-aminopyrazinoate (765 g., 5 moles) is suspended in 5 liters of dry benzene. While stirring under anhydrous conditions sulfuryl chloride (1.99 liters, 3318 g., 24,58 moles) is added over a period of 30 minutes and striring is continued for 1 hour. During this period, the temperature rises to about 50° C. and then begins to drop. The mixture is heated cautiously to reflux (60° C.), refluxed for 5 hours and then stirred over night at room temperature. The excess sulfuryl chloride is distilled off at atmospheric pressure (distillation is stopped when vapor temperature reaches 78° C.). The dark red mixture is chilled to 6° C. The crystals are filtered off, washed by displacement with two 100 ml. portions of cold (8° C.) benzene, then washed with 300 ml. petroleum ether and dried in vacuo at room temperature, yielding 888 g. (80%) of methyl 3-amino-5,6-dichloropyrazinoate in the form of red crystals, M.P. 228–230° C. The crude product is dissolved in 56 liters of boiling acetonitrile and passed through a heated (70–80° C.) column of decolorizing chracoal (444 g.). The column is washed with 25 liters of hot acetonitrile, the combined eluate concentrated in vacuo to about 6 liters and chilled to 5° C. The crystals that form are filtered, washed three times with cold acetonitrile, and air dried to constant weight, yielding 724 g. (82% recovery, 66% overall) of methyl 3-amino-5,6-dichloropyrazinoate in the form of yellow crystals, M.P. 230–234° C. After additional recrystallizaions from acetonitrile the product melts at 233–234° C.

Analysis.—Calculated for $C_6H_5Cl_2N_3O_2$: C, 32.46; H, 2.27; N, 18.93; Cl, 31.94. Found: C, 32.83; H, 2.35; N, 19.12; Cl, 31.94.

EXAMPLE 2

Methyl 3-amino-5,6-dichloropyrazinoate

Step A—Preparation of methyl 3-amino-6-chloropyrazinoate.—A 5-liter, 3-necked flask equipped with a mechanical stirrer, thermometer and gas inlet tube is charged with a warm (about 38° C.) mixture of water (3180 ml.) and glacial acetic acid (750 ml.), and methyl 3-aminopyrazinoate (90 g., 0.588 mole) then is added. The stirrer is started and the mixture heated to 41° C. which causes nearly all the ester to dissolve. The solution then is cooled to just below 40° C. via an ice bath. With vigorous stirring, chlorine (about 140 g.) is passed through the solution over a period of 25 minutes. A precipitate begins to form after five minutes and becomes quite voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.).

Analysis.—Calculated for $C_6H_5Cl_2N_3O_2$: C, 32.46; H, 2.27; N, 18.93; Cl (total), 31.94, (active), 15.97. Found: C, 32.82; H, 2.34; N, 18.90; Cl (total), 32.09, (active), 16.06.

The moist methyl 3-chloroamino-6-chloropyrazinoate and a solution of sodium bisulfite (150 g.) in water (900 ml.) are placed in a 4-liter beaker and stirred mechanically for one-half hour. The temperature of the mixture is maintained at 25° C. by addition of ice. The light yellow methyl 3-amino-6-chloropyrazinoate is removed by filtration, suspended in 150 ml. of ice water and filtered. This process is repeated twice with 150 ml. portions of ice water and once with a 50 ml. portion of cold isopropyl alcohol. After drying in the air there is obtained 60 g. (55%) of methyl 3-amino-6-chloropyrazinoate, M.P. 195–161° C.

Analysis.—Calculated for $C_6H_6ClN_3O_2$: C, 38.42; H, 3.22; N, 22.40; Cl, 18.90. Found: C, 38.81; H, 3.54; N, 22.83; Cl, 18.39.

Step B—Preparation of methyl 3-amino-5,6-dichloropyrazinoate.—A 100 ml. round-bottomed flask fitted with a condenser and drying tube, dropping funnel and magnetic stirrer is charged with methyl 3-amino-6-chloropyrazinoate (9.35 g., 0.05 mole). Sulfuryl chloride (10 ml.) is added dropwise with stirring during a 10 minute period. After ¾ hour, gas is evolved; the mixture turns red and heat is evolved. After standing overnight at room temperature, the reaction is heated for one hour at 70° C. The excess sulfuryl chloride is removed by evaporation at reduced pressure. The product (11.2 g.) is recrystallized from acetonitrile (300 ml.) to give 4.2 g. (38%) of methyl 3-amino-5,6-dichloropyrazinoate, M.P. 225–227° C. Subsequent recrystallizations raise the melting point to 233–234° C. No depression occurs when a sample of this product is mix-melted with a sample of methyl 3-amino-5,6-dichloropyrazinoate prepared according to Example 1.

EXAMPLE 3

Methyl 3-amino-5,6-dichloropyrazinoate

A 500 ml. round-bottomed flask fitted with a condenser and drying tube, dropping funnel and magnetic stirrer is charged with methyl 3-amino-6-bromopyrazinoate (34.8 g., 0.15 mole) and sulfuryl chloride (89 ml.). The mixture is heated for one minute on a steam bath, whereupon a vigorous reaction occurs. The flask then is cooled on an ice bath. The mixture is allowed to stand for 20 hours at room temperature and then is heated for one-half hour on a steam bath at reduced pressure to remove the excess sulfuryl chloride. The red product is recrystallized from acetonitrile (400 ml.) after treatment with a decolorizing charcoal. The yield is 4.0 g. (12%) which after subsequent recrystallizations, melts at 233–234° C. No depression occurs when a sample of this product is mix-melted with a sample of methyl 3-amino-5,6-dichloropyrazinoate prepared according to Example 1.

EXAMPLE 4

Methyl 3-amino-5,6-dichloropyrazinoate

Step A—Preparation of methyl 3-amino-6-iodopyrazinoate.—Methyl 3-aminopyrazinoate (30.6 g., 0.2 mole) is suspended in 500 cc. of water. Mercuric acetate (39.8 g., 0.125 mole) is added, and the mixture stirred and heated on the steam bath while a solution (50.8 g., 0.2 mole) of iodine in 250 cc. of warm dioxane is rapidly added. The reaction mixture is stirred and heated for 40 minutes and then cooled and poured into 600 cc. of a 15% solution of potassium iodide in water. The solid product which precipitates is collected and recrystallized from 150 cc. of acetic acid to give 13.5 g. of methyl 3-amino-6-iodopyrazinoate, M.P. 199–201.5° C. A small sample recrystallized for analysis has M.P. 200–202° C.

Analysis.—Calcualted for $C_6H_6IN_3O_2$: C, 25.82; H, 2.17; N, 15.06; I, 45.48. Found: C, 26.18; H, 2.14; N, 14.81; I, 44.89.

Step B—Methyl 3-amino-5,6-dichloropyrazinoate. — This compound is prepared by essentially the same method described in Example 3, except that the methyl 3-amino-6-bromopyrazinoate used as starting material in Example 3, is replaced by an equimolecular quantity of methyl 3-amino-6-iodopyrazinoate.

EXAMPLE 5

Methyl 3-amino-5-chloro-6-phenylpyrazinoate

Step A—Preparation of methyl 3-amino-6-phenylpyrazinoate.—3-amino-6-phenylpyrazinoic acid (30 g., 0.14 mole) is added to a solution of hydrogen chloride (480 g.) in methanol (1500 ml.), and the mixture is stirred for 42 hours at room temperature. The mixture then is evaporated in vacuo to about one-quarter volume and poured into 1 liter of water. The mixture is made basic by the addition of sodium bicarbonate, and the product collected and recrystallized from methanol to give 21 g. of methyl 3-amino-6-phenylpyrazinoate, M.P. 140–141° C.

Analysis.—Calculated for $C_{12}H_{11}N_3O_2$: C, 62.93; H, 4.84; N, 18.32. Found: C, 62.72; H, 4.90; N, 18.27.

Step B—Preparation of methyl 3-amino-5-chloro-6-phenylpyrazinoate.—A mixture of methyl 3-amino-6-phenylpyrazinoate (28.6 g., 0.125 mole) and sulfuryl chloride (90 ml.) is stirred at room temperature for 1.5 hours. Excess sulfuryl chloride is removed by vacuum distillation. The residue is suspended in water and the mixture neutralized by addition of sodium bicarbonate solution. The insoluble product formed is collected and recrystallized from acetic acid to yield 15 g. of methyl 3-amino-5-chloro-6-phenylpyrazinoate, M.P. 184–190° C. Following repeated recrystallizations from acetic acid the melting point is increased to 187.5–191.5° C.

Analysis.—Calculated for $C_{12}H_{10}ClN_3O_2$: C, 54.66; H, 3.82; N, 15.94. Found: C, 54.58; H, 3.59; N, 15.98.

EXAMPLE 6

Methyl 3-amino-5-chloro-6-methylpyrazinoate

Step A—Preparation of methyl 3-amino-6-methylpyrazinoate.—A mixture of 3-amino-6-methylpyrazinamide (31 g., 0.20 mole ) and 10% sodium hydroxide solution (320 ml.) is stirred and heated on a steam bath for 30 minutes whereupon a clear solution is obtained. The solution is chilled and the sodium salt of 3-amino-6-methylpyrazinoic acid which precipitates is collected and air dried yielding 25 g. of the salt. A mixture of the sodium salt of 3-amino-6-methylpyrazinoic acid (97 g., 0.55 mole), dimethyl sulfate (77 g., 0.61 mole) and methanol (700 ml.) is stirred 19 hours at room temperature. A small amount of suspended solid is removed by filtration, and the filtrate evaporated to dryness in vacuo. The residue is stirred with a saturated sodium bicarbonate solution (200 ml.) and the insoluble product is collected, washed with water and dried, yielding 18 g. of methyl 3-amino-6-methylpyrazinoate, M.P. 138–140° C., which after recrystallization from benzene melts at 138.5–140.5° C.

*Analysis.*—Calculated for $C_7H_9N_3O_2$: C, 50.29; H, 5.43; N, 25.14. Found: C, 50.45; H, 5.49; N, 25.02.

*Step B—Preparation of methyl 3-amino-5-chloro-6-methylpyrazinoate.*—A mixture of methyl 3-amino-6-methylpyrazinoate (9.2 g., 0.053 mole) and sulfuryl chloride (65 ml.) is stirred for 30 minutes in a flask surrounded by a cold water bath. A vigorous reaction occurs. The product, which is a yellow solid, is collected and recrystallized from ethyl acetate to obtain 4.4 g. of methyl 3-amino-5-chloro-6-methylpyrazinoate, M.P. 176–178.5° C.

*Analysis.*—Calculated for $C_7H_8ClN_3O_2$: C, 41.70; H, 4.00; N, 20.84. Found: C, 41.59; H, 4.15; N, 20.86.

EXAMPLE 7

Methyl 3-amino-5-chloro-6-cyclohexylpyrazinoate

*Step A—Preparation of 3-amino-6-cyclohexylpyrazinamide.*—Aminomalonamidamidine dihydrochloride (52.5 g., 0.28 mole) is added to an ice-cold solution of cyclohexylglyoxal (46.9 g., 0.335 mole) in water (450 ml). Concentrated ammonium hydroxide solution (about 65 ml.) is added to make the solution basic. The solution is allowed to stand at room temperature for 20 hours and the precipitated product that forms is collected by filtration and recrystallized from 2-propanol to yield 3-amino-6-cyclohexylpyrazinamide (67%).

*Step B—Preparation of 3-amino-6-cyclohexylpyrazinoic acid.*—A mixture of 3-amino-6-cyclohexylpyrazinamide (32.3 g., 0.147 mole) and 10% sodium hydroxide solution (200 ml.) is stirred and heated on a steam bath for 30 minutes. When the resulting solution is chilled, the sodium salt of the product acid precipitates. The salt is collected, dissolved in hot water, and the solution acidified with hydrochloric acid to precipitate the 3-amino-6-cyclohexylpyrazinoic acid, M.P. 118–121° C. (61% yield), which is used directly in the next step without further purification.

*Step C—Preparation of methyl 3-amino-6-cyclohexylpyrazinoate.*—A solution of 3-amino-6-cyclohexylpyrazinoic acid (18.6 g., 0.084 mole) in a 33% solution of hydrogen chloride in methanol (160 ml.) is stirred for 24 hours at room temperature. The solution is evaporated to dryness in vacuo. The residue is triturated with sodium bicarbonate solution and the insoluble product is collected and recrystallized from 2-propanol to yield methyl 3-amino-6-cyclohexylpyrazinoate, M.P. 126.5–128.0° C. (49% yield).

*Analysis.*—Calculated for $C_{12}H_{17}N_3O_2$: C, 61.25; H, 7.28; N, 17.86. Found: C, 61.39; H, 7.12; N, 17.87.

*Step D—Preparation of methyl 3-amino-5-chloro-6-cyclohexylpyrazinoate.*—This compound is prepared by essentially the same method described in Example 6, Step B, except that the methyl 3-amino-6-methylpyrazinoate of Example 6, Step B, is replaced by an equimolecular quantity of methyl 3-amino-6-cyclohexylpyrazinoate.

EXAMPLE 8

Methyl 3-amino-6-chloro-5-phenylpyrazinoate

*Step A—Preparation of methyl 3-amino-5-phenylpyrazinoate.*—A solution of 3-amino-5-phenylpyrazinoic acid (0.084 mole) in a 33% solution of hydrogen chloride in methanol (160 ml.) is stirred for 24 hours at room temperature. The solution is evaporated to dryness in vacuo. The residue is triturated with sodium bicarbonate solution and the insoluble product collected and recrystallized from 2-propanol to give methyl 3-amino-5-phenylpyrazinoate. The product has a melting point of 231–232° C.

*Analysis.*—Calculated for $C_{12}H_{11}N_3O_2$: N, 18.32. Found: N, 18.27.

*Step B — Preparation of methyl 3-amino-6-chloro-5-phenylpyrazinoate.*—This compound is prepared by essentially the same method described in Example 5, Step B, except that the methyl 3-amino-6-phenylpyrazinoate of Example 5, Step B, is replaced by an equimolecular quantity of methyl 3-amino-5-phenylpyrazinoate.

EXAMPLE 9

Methyl 3-amino-6-chloro-5-methylpyrazinoate

*Step A—Preparation of methyl 3-amino-5-methylpyrazinoate.*—A mixture of 3-amino-5-methylpyrazinoic acid (30 g., 0.20 mole) and a 30% solution of hydrogen chloride in methanol (650 ml.) is stirred at room temperature for 42 hours. The resulting solution then is evaporated to dryness in vacuo. The solid residue is stirred with sodium bicarbonate solution and the insoluble product collected. The crude product is recrystallized twice from water to yield 15.4 g. of methyl 3-amino-5-methylpyrazinoate, M.P. 163–167° C. A further recrystallization from water increases the melting point to 165–167° C.

*Analysis.*—Calculated for $C_7H_9N_3O_2$: C, 50.29; H, 5.43; N, 25.14. Found: C, 50.05; H, 5.35; N, 24.88.

*Step B — Preparation of methyl 3-amino-6-chloro-5-methylpyrazinoate.*—This compound is prepared by essentially the same method described in Example 6, Step B, except that the methyl 3-amino-6-methylpyrazinoate of Example 6, Step B, is replaced by an equimolecular quantity of methyl 3-amino-5-methylpyrazinoate.

EXAMPLE 10

(3-amino-5,6-dichloropyrazinoyl)guanidine hydrochloride

Sodium metal (920 mg., 0.04 mole) is dissolved in 2-propanol (50 ml.) under anhydrous conditions, treated with guanidine hydrochloride (3.85 g., 0.04 mole), and filtered to remove the sodium chloride which forms. Methyl 3-amino-5,6-dichloropyrazinoate, from Example 1 (4.44 g., 0.02 mole) is added to the resulting guanidine solution and the mixture heated at reflux for 15 minutes and then cooled to 10° C. The solid product that forms (3.6 g., 72%) is collected, dissolved in 50 ml. of hot water containing 3 ml. of 6 N hydrochloric acid, filtered and cooled to give 3.4 g. of (3-amino-5,6-dichloropyrazinoyl)guanidine hydrochloride which melts at 259–261° C.

*Analysis.*—Calculated for $C_6H_7Cl_3N_6O$: C, 25.24; H, 2.47; N, 29.43. Found: C, 25.50; H, 2.91; N, 29.17.

EXAMPLE 11

3-amino-5,6-dichloropyrazinoic acid

A 200 ml. round-bottomed flask fitted with a condenser is charged with pulverized methyl 3-amino-5,6-dichloropyrazinoate (1.8 g., 0.0081 mole), water (120 ml.), and 40% sodium hydroxide (0.8 ml., 0.008 mole). The mixture is refluxed for 10 minutes with vigorous stirring, filtered, and the filtrate acidified with 6 N HCl (to a pH of 2). The product that separates (1.5 g.) is filtered, washed with water, and dissolved in 100 ml. of water containing 6 ml. of saturated aqueous sodium bicarbonate solution. The basic solution is filtered through a pad of decolorizing carbon (Norite), and the product is precipitated with 6 N HCl, filtered, washed with water and dried to give the product, M.P. 227° C. (dec.).

*Analysis.*—Calculated for $C_5H_3Cl_2N_3O_2$: C, 28.87; H, 1.44; Cl, 34.09. Found: C, 29.30; H, 1.65; Cl, 33.44.

EXAMPLE 12

(3-amino-5-dimethylamino-6-chloropyrazinoyl) guanidine (3-amino-5,6-dichloropyrazinoyl)guanidine hydrochloride (100 mg.) from Example 10 is dissolved in 5 ml. of dimethylformamide to which is added 1 ml. of commercial 25% aqueous dimethylamine. The mixture is heated for 1 hour on a steam bath and then diluted with 25 ml. of water, whereupon (3-amino-5-dimethylamino-6-chloropyrazinoyl)guanidine is obtained, M.P. 216–217° C.

*Analysis.*—Calculated for $C_8H_{12}ClN_7O$: C, 37.28; H, 4.69; N, 38.05; Cl, 13.76. Found: C, 37.24; H, 4.49; N, 37.83; Cl, 13.76.

It is to be understood that the methods described in the discussion and examples are illustrative of those methods which can be employed and are not to be construed as limiting the invention to the particular methods or the particular compounds specifically described.

What is claimed is:

1. A compound selected from the group of compounds having the following structural formulas:

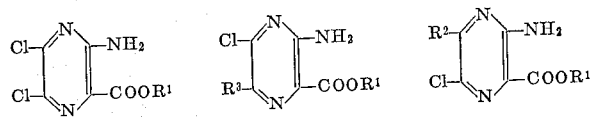

wherein $R^1$ is selected from the group consisting of hydrogen and a lower alkyl group, and $R^2$ is selected from the group consisting of lower alkyl, cycloalkyl having from 5 to 8 carbon atoms and phenyl.

2. Methyl 3-amino-5,6-dichloropyrazinoate.
3. Methyl 3-amino-5-chloro-6-phenylpyrazinoate.
4. Methyl 3-amino-5-chloro-6-methylpyrazinoate.
5. 3-amino-5,6-dichloropyrazinoic acid.
6. The process for preparing lower alkyl 3-amino-5-chloro-6-$R^2$-pyrazinoate, which comprises reacting sulfuryl chloride with lower alkyl 3-amino-6-$R^2$-pyrazinoate wherein $R^2$ is selected from the group consisting of lower alkyl, cycloalkyl having from 5 to 8 carbon atoms and phenyl at 25° C. to 70° C. in a solvent selected from the group consisting of an inert organic solvent and sulfuryl chloride.
7. The process which comprises the reaction of sulfuryl chloride with a 3-amino-2-(Z—CO—)-pyrazine compound which is unsubstituted in at least one of the positions 5 and 6 to form the corresponding 3-amino-2-(Z—CO—)-pyrazine compound which has chlorine in place of hydrogen at said unsubstituted positions, wherein Z is selected from the group consisting of —OR and

wherein R and $R^1$ respectively are selected from the group consisting of hydrogen and lower alkyl the reaction being carried out at 25° C. to 70° C. in a solvent selected from the group consisting of an inert organic solvent and sulfuryl chloride.

8. The process for preparing lower alkyl 3-amino-6-chloro-5-$R^2$-pyrazinoate which comprises reacting sulfuryl chloride with lower alkyl 3-amino-5-$R^2$-pyrazinoate, wherein $R^2$ is selected from the group consisting of lower alkyl, cycloalkyl having from 5 to 8 carbon atoms and phenyl at 25° C. to 70° C. in a solvent selected from the group consisting of an inert organic solvent and sulfuryl chloride.

9. A process for preparing 3-amino-5,6-dichloropyrazinoic acid which comprises the reaction at 25° C. to 70° C. in a solvent selected from the group consisting of an inert organic solvent and sulfuryl chloride of a compound selected from the group consisting of lower alkyl 3-aminopyrazinoate, lower alkyl 3-amino-6-chloropyrazinoate, lower alkyl 3-amino-6-bromopyrazinoate and lower alkyl 3-amino-6-iodopyrazinoate with sulfuryl chloride to form lower alkyl 3-amino-5,6-dichloropyrazinoate and then hydrolyzing the latter compound in an aqueous alkaline solution.

10. The process for preparing loweralkyl 3-amino-5,6-dichloropyrazinoate which comprises the reaction of a compound selected from the group consisting of loweralkyl 3-aminopyrazinoate, loweralkyl 3-amino-6-chloropyrazinoate, loweralkyl 3-amino-6-bromopyrazinoate and loweralkyl 3-amino-6-iodopyrazinoate with sulfuryl chloride within the temperature range of 25° C. to 75° C. and in a solvent selected from the group consisting of an inert organic solvent and sulfuryl chloride.

References Cited by the Examiner

Fieser: Organic Chemistry (third edition, 1956), pages 46–7.

NICHOLAS S. RIZZO, *Primary Examiner.*

HENRY R. JILES, *Examiner.*